United States Patent [19]
Nakahira et al.

[11] Patent Number: 5,842,022
[45] Date of Patent: Nov. 24, 1998

[54] LOOP OPTIMIZATION COMPILE PROCESSING METHOD

[75] Inventors: Tadashi Nakahira; Masatoshi Haraguchi, both of Kawasaki, Japan

[73] Assignee: Fujitsu Limited, Kawasaki, Japan

[21] Appl. No.: 722,945

[22] Filed: Sep. 27, 1996

[30] Foreign Application Priority Data

Sep. 28, 1995 [JP] Japan .................................. 7-250264

[51] Int. Cl.[6] .................................................. G06F 9/45
[52] U.S. Cl. ................................... 395/709; 395/705
[58] Field of Search ................................. 395/709, 588, 395/706, 671, 701, 705

[56] References Cited

U.S. PATENT DOCUMENTS 5,109,331  4/1992  Ishida et al. ............................ 395/709

OTHER PUBLICATIONS

"Advanced Compiler Optimizations For SuperComputers", David A. Padua and Michael J. Wolfe; Comm of The ACM. Dec. 1986, vol. 29.

"Compiler Code Transformations for Supercolor–Based High–performance System", Scott A. Mahlke et al., 1992 IEEE.

"Compilers, Principal, Techniques, and Tool", Alfred V. Aho et al., 1986 Bell Tel. Laboratories, Incorp.

*Primary Examiner*—Majid A. Banankhah
*Attorney, Agent, or Firm*—Staas & Halsey

[57] ABSTRACT

The entire space of a loop is analyzed for dependencies between target array elements so that dependency ID's are assigned to the target array elements. Optimization is carried out on the basis of the dependency ID's. Dependency ID's covering dependency for an arbitrary turn of the loop are reassigned to the target array elements that have been subjected to optimization, whereupon a further optimization is carried out. An examination for identifying overlappings is carried out on the basis of the dependency ID assigned to the target array elements so that instruction scheduling is carried out.

13 Claims, 13 Drawing Sheets

FIG. 1A (PROGRAM 1)

```
      DO 10 J = 1, MAX
         S = 0.0
         DO 20 I = 1, MAX
            S = S + A(I,J) * B(I,J)
20       CONTINUE
10    CONTINUE
```

FIG. 1B (PROGRAM 2) (LOOP UNROLLING)

```
      DO 10 J = 1, MAX
         S = 0.0
         DO 20 I = 1, MAX, 4
            S = S + A(I,J)   * B(I,J)
            S = S + A(I+1,J) * B(I+1,J)
            S = S + A(I+2,J) * B(I+2,J)
            S = S + A(I+3,J) * B(I+3,J)
20       CONTINUE
10    CONTINUE
```

FIG. 1C (PROGRAM 3) (LOOP REDUCTION)

```
      DO 10 J = 1, MAX
         S  = 0.0
         S1 = 0.0
         S2 = 0.0
         S3 = 0.0
         DO 20 I = 1, MAX, 4
            S  = S  + A(I,J)   * B(I,J)
            S1 = S1 + A(I+1,J) * B(I+1,J)
            S2 = S2 + A(I+2,J) * B(I+2,J)
            S3 = S3 + A(I+3,J) * B(I+3,J)
20       CONTINUE
         S  = S  + S1
         S2 = S2 + S3
         S  = S  + S2
10    CONTINUE
```

FIG. 2
```
        DO 2400 I = 1, MAX
          DO 2600 J = 1, MAX
            INDX = MAX - J+1
            DO 2800 K = INDX+1, MAX
              BB(INDX,I) = BB(INDX,I) - CC(INDX,K) * BB(K,I)
2800        CONTINUE
            BB(INDX,I) = BB(INDX,I) / CC(INDX,INDX)
2600      CONTINUE
2400    CONTINUE
```
FIG. 3A
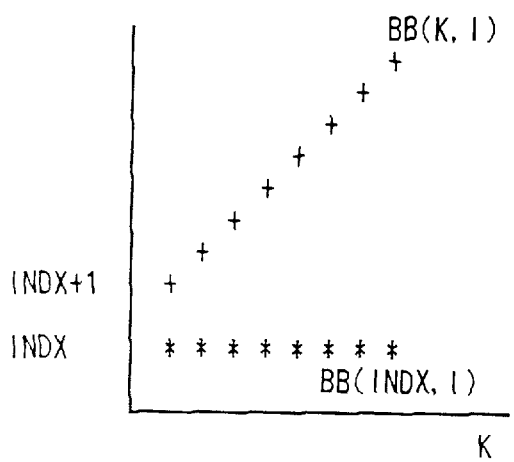
FIG. 3B
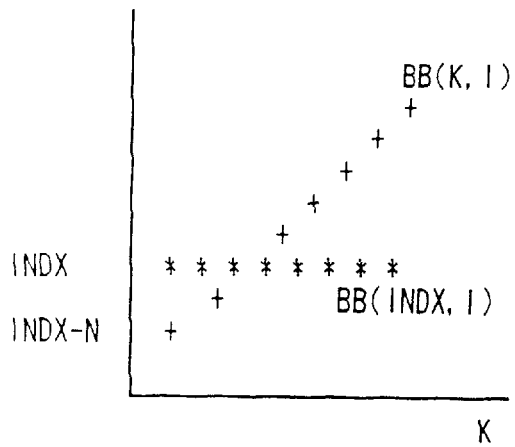

FIG. 5A

SOURCE PROGRAM SUBJECT TO ANALYSIS OF
ALL ARRAY ELEMENTS FOR OVERLAPPING

```
           DO 2400 I = 1, MAX
              DO 2600 J = 1, MAX
              INDX = MAX - J+1
              DO 2800 K = INDX+1, MAX
                 BB(INDX, I) = BB(INDX, I) - CC(INDX, K) * BB(K, I)
 2800         CONTINUE
              BB(INDX, I) = BB(INDX, I) / CC(INDX, INDX)
 2600      CONTINUE
 2400   CONTINUE
```

FIG. 5B

APPLICATION OF OPTIMIZATION TO SOURCE PROGRAM

```
           DO 2400 I = 1, MAX
              DO 2600 J = 1, MAX
              INDX = MAX - J+1
              S = BB(INDX, I)
              DO 2600 K = INDX+1, MAX
                 S = S - CC(INDX, K) * BB(K, I)
 2800         CONTINUE
              BB(INDX, I) = S
              BB(INDX, I) = BB(INDX, I) / CC(INDX, INDX)
 2600      CONTINUE
 2400   CONTINUE
```

FIG. 6

```
        DO 2400 I = 1, MAX
          DO 2600 J = 1, MAX
            INDX = MAX - J+1
            S  = BB(INDX, I)
            S1 = 0
            S2 = 0
            S3 = 0
            DO 2800 K = INDX + 1, MAX, 4
              S  = S  - CC(INDX, K)   * BB(K, I)
              S1 = S1 - CC(INDX, K+1) * BB(K+1, I)
              S2 = S2 - CC(INDX, K+2) * BB(K+2, I)
              S3 = S3 - CC(INDX, K+3) * BB(K+3, I)
2800        CONTINUE
            BB(INDX, I) = S + S1 + S2 + S3
            BB(INDX, I) = BB(INDX, I) / CC(INDX, INDX)
2600      CONTINUE
2400    CONTINUE
```

FIG. 7

```
        DO 6 K = N, 0, -1
          DO 9 L = 0, NMAT
            B(I, L, K) = B(I, L, K) * A(L, 0, K)
9         CONTINUE
          DO 6 JJ = 1, MIN (M, K)
            DO 6 L = 0, NMAT
              B(I, K, L-JJ)=B(I, K, L-JJ)-A(L, K, -JJ)*B(I, K, L)
6         CONTINUE
```

+ BB(I, K, L)
* BB(I, K, L-JJ)

L

DEPENDENCY IN A GIVEN TURN

```
Do I = 1, N
    A(I) = ...
    ... = A(I)
ENDDO
```

DEPENDENCY ACROSS DIFFERENT TURNS OF LOOP

```
Do I = 1, N
    A(I) = A(I-1)
      ⋮       ⋮
ENDDO
```

FIG. 10A
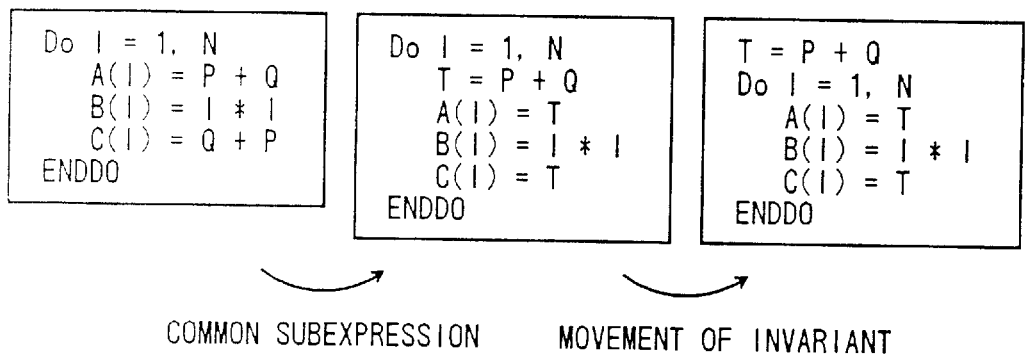
COMMON SUBEXPRESSION    MOVEMENT OF INVARIANT
FIG. 10B
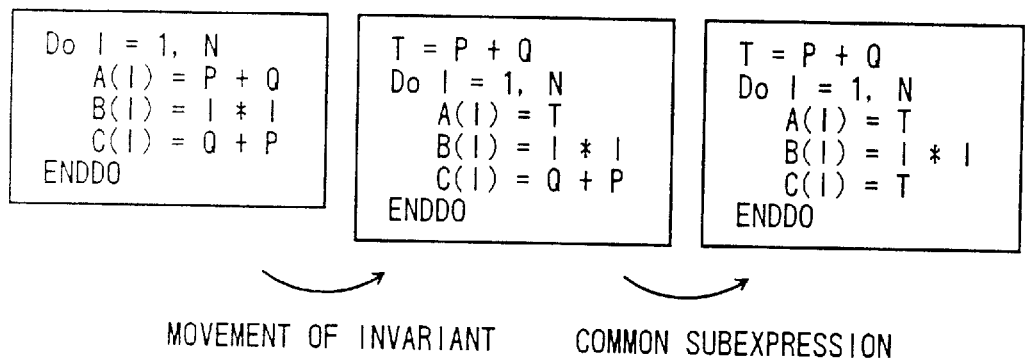
MOVEMENT OF INVARIANT    COMMON SUBEXPRESSION
FIG. 11
```
      DO 10 J = 1, MAX
        DO 20 I = 1, MAX
          A(I,J) = A(I,J) * A(I-1,J)
 20     CONTINUE
 10   CONTINUE
```

| DEPENDENCY ID | OVERLAPPING ANALYSIS RESULT |
|---|---|
| 0 | UNASSIGNED |
| 1 | NO OVERLAPPING |
| 2～49 | UNIDENTIFIED, INVARIANT IN THE INNERMOST INDEX SPACE |
| 50～149 | DEPENDENCY THAT DEPENDS ON DIRECTION IN WHICH INDEX SPACE IS EXAMINED ARISES |
| 150～250 | DEPENDENCY ARISES AS A RESULT OF REPETITIONS OF LOOP |

FIG. 14A

```
DO I = 1, N
    A[ I ] = I
    P = A[ K ]
    A[ I ] = A[ I ] + P
ENDDO
```
→
```
P = A[ K ]
DO I = 1, N
    A[ I ] = I
    A[ I ] = A[ I ] + P
ENDDO
```

VALUE OF K IS SUCH THAT K<1, K>N
(DETERMINED IN COMPILATION TIME)

FIG. 14B

```
DO I = 1, N
    A[ I ] = I
    A[ K ] = 4
ENDDO
```
→
```
DO I = 1, N
    A[ I ] = I
ENDDO
A[ K ] = 4
```

VALUE OF K IS SUCH THAT K<1, K>N
(DETERMINED IN COMPILATION TIME)

FIG. 15

```
DO I = 1, N
    ... = A[ K ]
    A[ I ] = ...
    ... = A[ K ]
ENDDO
```
→
```
P = A[ K ]
DO I = 1, N
    ... = P
    A[ I ] = ...
    ... = P
ENDDO
```

VALUE OF K IS SUCH THAT K<1, K>N
(DETERMINED IN COMPILATION TIME)

VALUE OF K IS SUCH THAT K<1, K>N
(DETERMINED IN COMPILATION TIME)

FIG. 17

(A)
```
DO I = 1, N
    A[ K ] = A[ K ] + A[ I ]
ENDDO
```
VALUE OF K IS SUCH THAT K<1, K>N
(DETERMINED IN COMPILATION TIME)

(B)
```
P = A[ K ]
DO I = 1, N
    P = P + A[ I ]
ENDDO
A[ K ] = P
```

(C)
```
P = A[ K ]
P1 = 0
P2 = 0
DO I = 1, N, 3
    P  = P  + A[ I ]
    P1 = P1 + A[ I+1 ]
    P2 = P2 + A[ I+2 ]
ENDDO
P = P + P1
P = P + P2
A[ K ] = P
```

FIG. 18

(A)
```
DO I = 1, N
A(I) = A(I+1)
  ①      ②
ENDDO
```
①, ② : DEPENDENCY ID=50

(B)
```
DO I = 1, N, 2
A(I) = A(I+1)
  ③      ④
A(I+1) = A(I+2)
  ⑤        ⑥
ENDDO
```
③, ④, ⑤, ⑥ : DEPENDENCY ID=50

ENDDO
``` s1: DEPENDENCY ID FOR ENTIRE TURNS OF LOOP
s2: DEPENDENCY ID FOR ONE TURN OF LOOP

LOOP OPTIMIZATION COMPILE PROCESSING METHOD

BACKGROUND OF THE INVENTION

1. Field of the Invention

The present invention relates to a loop optimization compile processing method for parallel processing of instructions in a compiler capable of optimization.

A majority of recently produced RISC processors are processors such as superscalar processors which are capable of issuing more than one instructions prompted by a single clock. Full exploitation of such RISC processors requires a high-performance compiler capable of analyzing the dependencies between the instructions in detail so that a program is executed in an intensively parallel fashion. One of the recent trends is that an optimization technology conventionally used in supercomputers is applied to RISC compilers so that more advanced optimization of instructions in parallel RISC processors is achieved. In supercomputers, loops that are executed frequently are vectorized so that the overall throughput is improved. In determining whether or not a loop can be vectorized, an emphasis is placed on analyzing the dependencies between the array elements in the loops.

The present invention is intended to apply the above-mentioned technique to parallel RISC processors. Namely, the optimization method is applied to parallel RISC processors whereby the dependencies between memory access data is analyzed so that the execution performance is improved. The present invention provides hitherto unavailable means to analyze the dependencies between data in a loop. By utilizing the result of such an analysis, more advanced optimization by a compiler is achieved. In addition, factors that prevent movement of instructions from one location to another according to the instruction scheduling can be eliminated so that the level of parallel processing of the instructions can be improved.

2. Description of the Related Art

Some of the conventional RISC compilers analyze a loop executed frequently by analyzing the dependencies found when a turn of the loop is traversed or by enforcing an optional condition which specifies memory access dependencies when compiling. Analysis of the dependencies between instructions is conducted primarily for the purpose of instruction scheduling. The result of analysis is used as a resource for facilitating the rearrangement of instructions according to the instruction scheduling. If the subject of the scheduling is a simple loop, such a method proves effective.

FIGS. 1A through 1C shows the loop expansion and the loop reduction as being applied to a source program comprising a simple loop. For example, in the program 1 shown in FIG. 1A, optimization by analyzing the dependencies found when an arbitrary turn of the loop is traversed improves the execution performance.

In other words, according to the related art—

(1) Since A(I, J) and B(I, J) in the program 1 shown in FIG. 1A are different array elements, there is no dependency between respective memory accesses. Therefore, there are no factors that prevent instructions from being moved from one location to another according to the instruction scheduling. When the multiple loop expansion (loop unrolling) is carried out as shown in the program 2 of FIG. 1B, array elements A(I+1, J) and A(I+2, J) produced as a result of the loop expansion share the same base address and index as the array element A(I, J) so that a determination that there is no overlapping results.

(2) Since the innermost loop has a format S=S+V (S: scalar, V: vector), an optimization scheme known as loop reduction can be applied to a program as shown in the program 3 of FIG. 1C. As a result of the optimization using the loop reduction, dependencies between the instructions can be eliminated so that the level of parallel processing of the instructions can be improved.

The vectorizing compiler requires determination of the dependencies between the array elements in the entirety of the loop space. For example, Japanese Laid-Open Patent Application No. 62-206637 "Array data flow analyzer" discloses a method for determining the dependencies (data flow) between the array elements in the entire index space.

Conventional optimization compile processing methods for RISC processors such as superscalars include an optimization whereby the dependencies found when a turn of the loop is traversed are determined. However, such an optimization has not been performed in cooperation with the analysis of the dependencies between the array elements in the entire index space of the loop.

While a simple loop program such as the program 1 shown in FIG. 1A is subject to conventional optimization, some programs like the one shown in FIG. 2 are not subject to optimization unless the overlapping relations between all the array elements in the index space (Index: K) of the innermost loop have been analyzed. Other programs are subject to optimization only with great difficulty.

In the program shown in FIG. 2, the array element BB (INDX, I) is a region constant Rc in the innermost loop and can be identified according to the conventional method. However, a problem remains that a determination as to whether or not the array element BB (INDX, I) is really a region constant in the loop is impossible unless the overlapping With respect to the array element BB (K, I) in the entire index space of the innermost loop K has been analyzed. More specifically, the conventional technology has the following problems.

(a) It is assumed that the array elements BB (INDX, I) and BB (K, I) follow respective tracks as shown in FIG. 3A in the index space of the innermost loop K. In this case, by examining the index space of the innermost loop K for overlapping, a determination that the array element BB (INDX, I) is a region constant (Rc) in the loop. If the array elements follow respective tracks as shown in FIG. 3B, it is not determined that the array element BB (INDX, I) is a region constant because the tracks cross (overlap) each other at a point in the loop.

(b) Since it is impossible to determine whether or not the array element BB (INDX, I) in the program of FIG. 2 is a region constant in the loop, an optimization scheme (for example, the loop reduction) for improving the level of parallel processing of the instructions cannot be employed. Even if employed, such an optimization scheme will prove less effective than expected because of the memory access dependencies of the array elements in the innermost loop. Identification of a region constant (Rc) in the loop makes it possible to transform the instruction in the innermost loop into the S=S+V format. As a result, the loop reduction as shown in FIG. 1C is employed.

(c) Since it is impossible to identify the overlapping of the array elements BB (INDX, I) and BB (K, J) in the program of FIG. 2 in the index space K, a memory load operation for BB (K, J) cannot be placed ahead of a storage operation for BB (INDX, I) according to the instruction scheduling. Therefore, flexibility in moving instructions from one location to another according to the instruction scheduling is limited and the level of parallel processing of the instructions in the loop is not improved even when the loop expansion is carried out.

SUMMARY OF THE INVENTION

Accordingly, an object of the present invention is to provide a loop optimization compile processing method in which the aforementioned problems are eliminated.

Another and more specific object of the present invention is to provide a loop optimization compile processing method in which the optimization is facilitated using the following schemes (1)–(4).

(1) Analyzing in detail the dependencies occurring in the entire index space of a loop with respect to memory accesses for the array elements.

(2) Applying optimization for increasing the level of parallel instruction processing to a target program on the basis of the result of the analysis of (1).

(3) Reflecting the result of the analysis in (1) in the instruction scheduling so as to increase the flexibility in moving instructions from one location to another.

(4) Combining the result of the analysis in (1) with the result of an analysis of the dependencies found when an arbitrary turn of the loop is traversed, and eliminating the dependencies that may present a problem in the process of optimization.

The aforementioned objects of the present invention can be achieved by a loop optimization compile processing method for use in a compile processing apparatus adapted for a computer program and having an optimization function, the loop optimization compile processing method comprising the steps of: a) analyzing an entire space of a loop for dependencies between array elements and analyzing an arbitrary turn of the loop for dependencies between the array elements; and b) assigning dependency identification information to the array elements, based on an analysis result obtained in step a).

The loop optimization compile processing method may further comprise the steps of: c) detecting loop invariant array elements on the basis of the dependency identification information relating to dependencies between the array elements in the entire space of the loop; and d) transforming a target of compilation into a form that enables loop optimization for improving a level of parallel processing.

In step d), the loop invariant array elements detected in step c) may be targets in a transformation process whereby invariant expressions and common subexpressions are moved to appropriate locations.

Loop optimization for improving a level of parallel processing may be carried out on the basis of the dependency identification information.

Instruction scheduling for rearranging instructions on the basis of the dependency identification information may be carried out.

BRIEF DESCRIPTION OF THE DRAWINGS

Other objects and further features of the present invention will be apparent from the following detailed description when read in conjunction with the accompanying drawings, in which:

FIGS. 1A, 1B and 1C show examples of loop expansion and loop reduction applied to a simple loop;

FIG. 2 is a sample source program subject to analysis of overlapping relations between all array elements;

FIGS. 3A and 3B show tracks followed by array elements in an index space K;

FIGS. 5A and 5B show optimization applied to a sample program subject to analysis of overlapping relations between all array elements;

FIG. 6 shows a result of the loop reduction applied to a source program of FIGS. 5A and 5B;

FIG. 7 shows a sample source program in which instruction scheduling is efficiently applied;

FIGS. 10A and 10B show examples of movement of a common subexpression;

FIG. 11 shows a sample target program subject to analysis of dependencies;

FIGS. 14A and 14B show examples of movement of an invariant using the dependency ID;

FIG. 15 shows an example of movement of a common subexpression using the dependency ID;

FIG. 17 shows an example of loop reduction induction;

FIG. 18 shows how the dependency ID is reassigned after the loop expansion;

FIG. 19 is how the dependency ID is assigned for the purpose of the instruction scheduling.

DESCRIPTION OF THE PREFERRED EMBODIMENTS

A description will first be given of the principle of the present invention.

Figure 4:
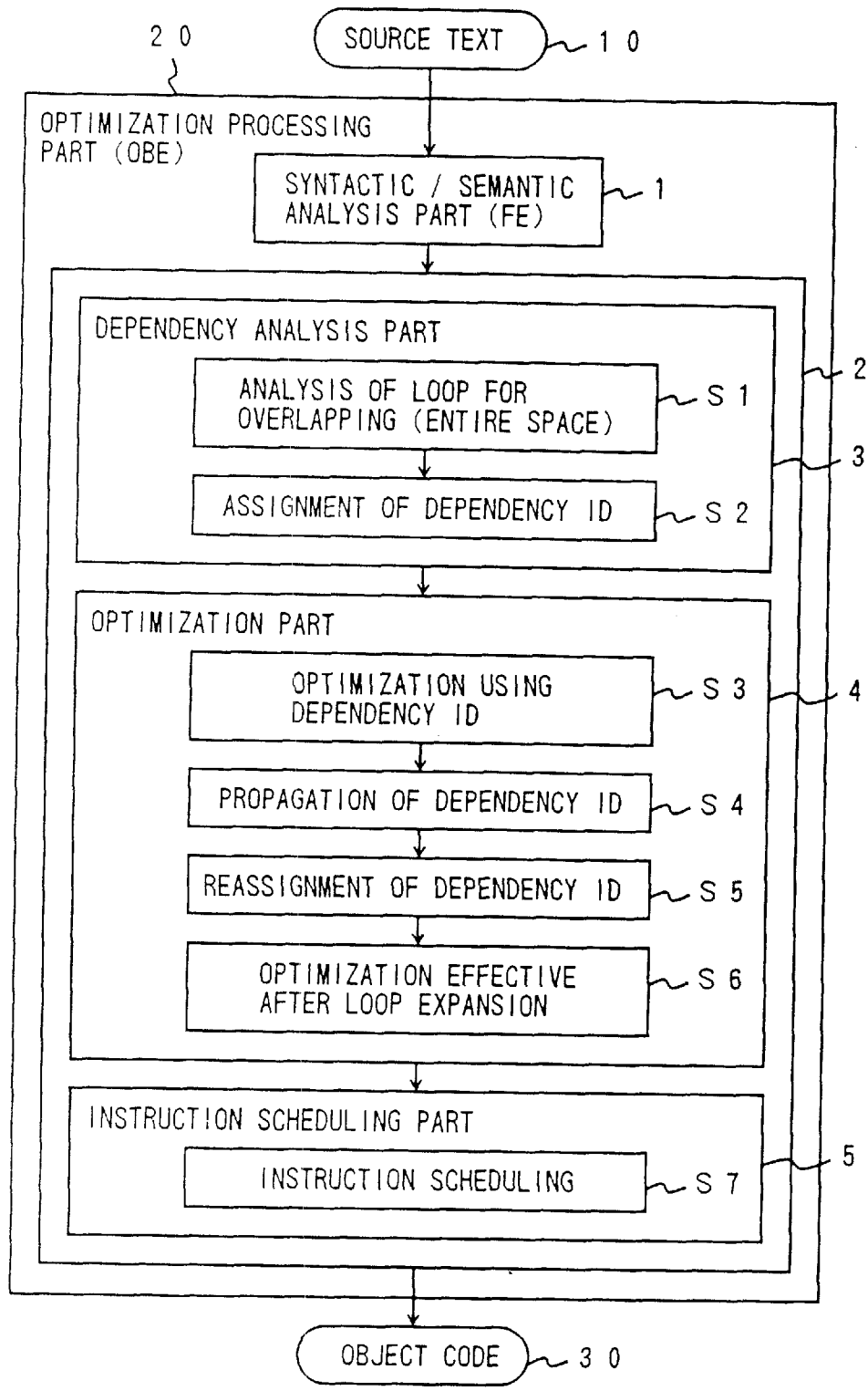
FIG. 4 shows a principle of the present invention.

FIG. 4 shows the principle of the present invention. A processing unit 20 implemented by CPUs and memories comprises a syntactic/semantic analysis part (FE:Front-End) 1 and an optimization processing part (OBE:Optimize Back-End) 2. The optimization processing part 2 comprises a dependency analysis part 3, an optimization part 4 and an instruction scheduling part 5.

The syntactic/semantic analysis part 1 subjects a source text 10 containing a source program to syntactic/semantic analysis so as to generate an intermediate language. The optimization processing part 2 applies optimization schemes to the intermediate language generated by the syntactic/semantic analysis part 1 so as to output an object code 30, that is, a result of compilation.

The present invention facilitates optimization according to the following steps shown in FIG. 4.

[Step S1] Analysis of overlappings in a loop

In step S1, dependencies (overlappings) between array elements in the entire space of the loop are analyzed.

[Step S2] Assignment of a dependency ID

In step S2, a dependency ID is assigned to the array elements based on the result of the analysis of step S1, the dependency ID serving as information identifying a dependency.

[Step S3] Optimization that uses the dependency ID

In step S3, array elements which are region constants (Rc) in the loop are identified based on the dependency ID assigned in step S2. The target array elements are then transformed so that the loop optimization (loop reduction etc.) performed in step S6 described below is enabled. For example, transformation that enables the loop reduction will be referred to as "loop reduction induction" hereinafter. The loop reduction induction includes movement of an invariant expression from one location to another and movement of a common subexpression from one location to another.

[Step S4] Propagation of the dependency ID after loop expansion

In step S4, the dependency ID is assigned to a copy of an array element after the loop expansion.

[Step S5] Restoration of dependency ID

In step S5, the loop not subjected to the analysis of the dependencies and the array elements wherein a dependency arises depending on the direction in which the index space is traversed are examined for the dependency found in an arbitrary turn of the loop. The dependency ID is then reassigned.

[Step S6] Loop optimization after loop expansion

In step S6, optimization schemes including loop reduction, renaming and software pipelining are performed based on the dependency ID reassigned in step S5.

[Step S7] Instruction scheduling

In step S7, instructions (load, store etc.) relating to memory accesses are moved to appropriate locations according to the instruction scheduling, on the basis of the dependency ID.

A description will now be given of the technical background for processes performed in the steps described above.

(A) Overlapping analysis and optimization applied to array elements in the index space It is now assumed that the dependencies between the array elements in the entire loop (that is, in the index space of the innermost loop) have been analyzed so that the dependencies in the innermost loop of the program shown in FIG. 5A are determined. The source program of FIG. 5A is the same as the program shown in FIG. 2 and requires analysis of the overlapping relations between all the array elements. It is found as a result of the analysis that the array element BB (INDX, I) does not overlap the array element BB (K, I) in the index space K.

Since it is determined that the array element BB (INDX, I) does not overlap the array element BB (K, I), it is now possible to convert the array element BB (INDX, I) into a variable S. The innermost loop in the program of FIG. 5A can now be transformed into the loop shown in FIG. 5B. As a result of this transformation, the innermost loop has a format S=S+V so that the loop reduction can be applied thereto. FIG. 6 shows a result of the loop reduction applied to the source program of FIG. 5B.

(B) Relation between analysis of dependencies and instruction scheduling

In order to enhance the effect of instruction scheduling, it is necessary to improve the flexibility in moving instructions from one location to another. It is particularly important to identify conflicts between memory access data and deliver the information relating to the conflict to the instruction scheduling. A description will be given in the following of optimization whereby the dependencies between the array elements in the entire loop as determined by an analysis are delivered to the instruction scheduling so as to improve the flexibility in moving instructions from one location to another.

First, the dependencies between the array elements in the innermost loop (DO 6) in the source program as shown in FIG. 7 is considered. In this innermost loop, it is particularly important to determine the dependency between the array elements B (I, K, L-JJ) and B (I, K, L). This dependency cannot be determined accurately according to the conventional approach whereby the dependency found when a single turn of the loop is traversed is identified. The conventional approach yields an analysis that an overlapping occurs between the above-identified array elements, thus preventing movement of the instructions to appropriate locations from being performed according to the instruction scheduling.

Figures 8, 9A, 9B:
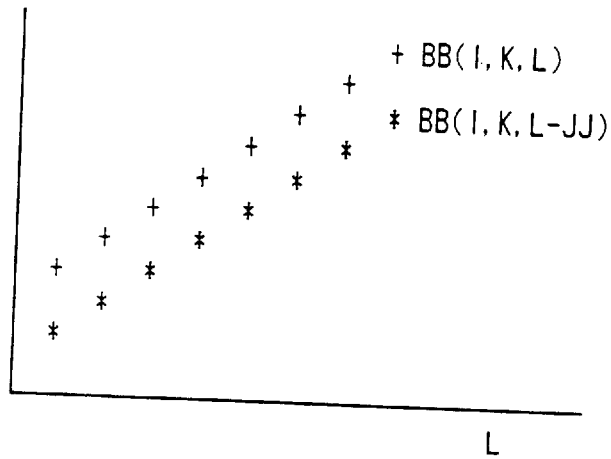
FIG. 8 shows tracks of array elements in an index space L.
FIGS. 9A and 9B are diagrams explaining loop carried dependency.

An analysis of the dependencies in the entire loop results in the track as shown in FIG. 8 followed in the index space (L) of the innermost loop. It is found that there is no dependency between the array elements B (I, K, L-JJ) and B (I, K, L) in the same index space.

Thus, the analysis according to the present invention as described above provides information relating to the dependencies in the loop which is subject to multiple expansion. As a result, the flexibility in moving instructions to appropriate locations according to the instruction scheduling is improved.

It will be appreciated that, according to the present invention, the dependencies between the array elements in the loop that cannot be analyzed according to the conventional approach are subject to analysis. The result of such analysis enables optimization schemes to be applied to a target program extensively. Accordingly, the object performance of the program can be improved.

A description will now be given of the embodiment of the present invention.

First, the terms used in describing the embodiments will be explained.

(1) Loop Carried Dependency

A dependency that arises when different turns of a loop are traversed is referred to as a loop carried dependency. For example, in the program as shown in FIG. 9A, the definition of A(I) and the reference to A(I) occur when the same turn of loop is traversed. In the program as shown in FIG. 9B, the definition of A(I) is referred to at A(I−1) in a turn subsequent to the turn in which the definition is given. Such a dependency is referred to as a loop carried dependency because it is a dependency carried over from one loop turn to another.

(2) Movement of a Common Subexpression

FIGS. 10A and 10B show examples of movement of a common subexpression. It will be noted in FIGS. 10A and 10B that, when a common subexpression is moved, a common subexpression elimination optimization and a movement of an invariant expression are performed in association with each other.

The following is a detailed description of the embodiments of the present invention.

[1] Analysis of overlapping of the array data in a loop:

An analysis of overlapping of the array data in a loop is a function for analyzing the dependencies between the array elements in the index space of a loop.

In the case of the source program shown in FIG. 11, it is required that the two dependencies, that is, a dependency between A(I, J) in the left and A(I, J) in the right and a dependency between A(I, J) in the left and A(I−1, J) in the right be determined. In the case of FIG. 11, the following results are obtained as a result of an analysis.

1 {A(I, J), A(I, J)}=0: a dependency arises for every 0 turn of the loop (namely, a dependency arises in a single turn and does not cross a plurality of turns).

2 {A(I, J), A(I-1, J)}=1: a dependency arises across successive turns

Analysis of the dependencies is conducted for all the array elements in the innermost loop subject to analysis.

[2] Assignment of the dependency ID

Figures 12, 13:
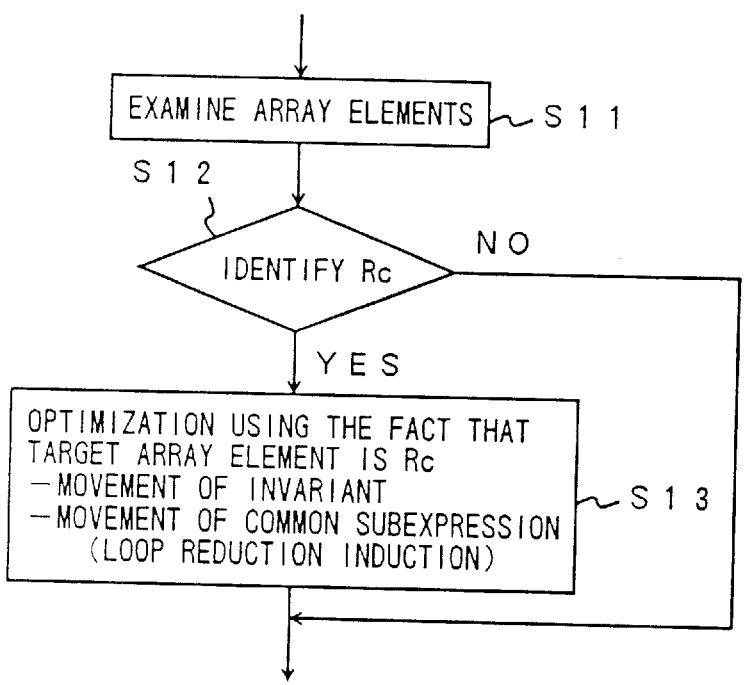
FIG. 12 is a table listing meanings of dependency ID.
FIG. 13 is a flowchart of a process for optimization that uses the dependency ID.

The dependency ID (any number between 0–255) is assigned to each of the array elements based on the result of the analysis of [1]. The procedure for assigning the dependency ID is described below. FIG. 12 is a table listing the meanings of the dependency ID numbers.

1 First, the dependency ID specifying "no overlapping" is assigned to all the array elements that appear in the loop.

2 The array elements in the innermost loop are examined for array elements that do not have any dependency relation in the index space of the innermost loop. When such array elements are found, an arbitrary dependency ID between 2 and 49 is assigned to them.

3 An examination is made as to whether or not there are array elements that have a loop carried dependency. When such array elements are found, an arbitrary dependency ID between 50 and 149 is assigned to them.

4 An examination is made as to whether or not there are array elements that have a dependency only at a point in the loop.

[3] Optimization that uses the dependency ID:

The following procedure is taken to perform an optimization that uses the dependency ID FIG. 13 is a flowchart showing the optimization process that uses the dependency ID.

In step S11, those array elements that are subject to the process are identified.

Next, in step S12, array elements that are loop invariant are identified.

In an optimization using the dependency ID, the following two analysis steps are performed so as to determine whether or not an array element is a region constant.

(1) Determine that the target array element is a region constant Rc when the loop carried dependency is not considered. In order for this determination to be achieved, the following conditions should be met.

(a) No base address of the array (head address of the array) and index redefinition are available.

(b) The base address and the index are not compiler generated variables (if the base address and the index are compiler generated variables, they should be defined in the loop in which they belong so that the target array element is not a loop invariant).

(c) The definition for a variable specifying the base address and the index does not exist in the same loop (instead, the base address and the index are determined from data flow).

(2) Determine that the target array element is a region constant Rc even when the loop carried dependency is considered and that the target array element is a true region constant Rc in the target loop. The following is how this determination is carried out.

(a) When the dependency ID of the target array element is 0, it is determined unconditionally that there is an overlapping.

(b) When the dependency ID of the target array element is 1, it is determined unconditionally that there is no overlapping, that is, the target array element is Rc.

(c) When the dependency ID of the target array element is between 2 and 250 and when none of the array elements has the same dependency ID, a determination that there is no overlapping, that is, a determination of Rc, results.

(d) When the dependency ID of the target array element is between 2 and 250 and when there are array elements in the loop that have the same dependency ID, a determination that there is no overlapping results unless the array elements have the same (dimension, suffix) format.

Next, in step S13, optimization using the fact that the target array element is a region constant is carried out. More specifically, an invariant expression or a common subexpression is moved to appropriate locations.

Subsequently, movement of an invariant expression and a common subexpression are carried out with respect to the target array element. Further, loop reduction induction for modifying the source program into a format subject to loop reduction is carried out.

1 Movement of an invariant

When the target array element A[K] is found to be Rc, movement of an invariant expression is carried out as shown in FIGS. 14A and 14B respectively showing cases where invariant expressions for loading and storing the target array element A[K] are moved.

2 Movement of a common subexpression

In case the target array element A[K] is determined to be Rc and is only referred to in another location in the loop, movement of a common subexpression is carried out as shown in FIG. 15.

Figure 16:
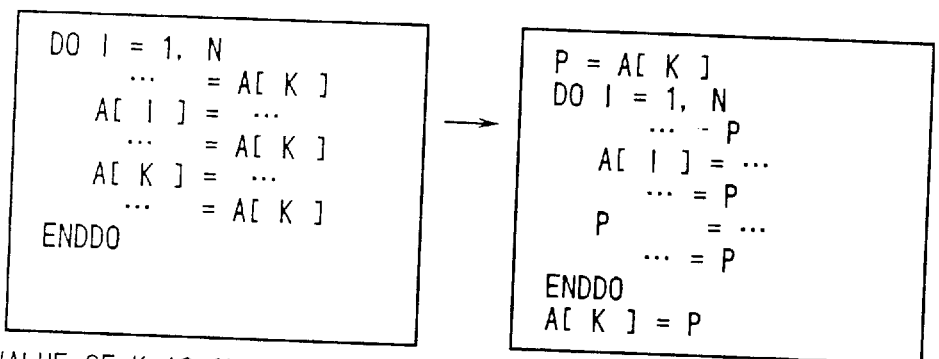
FIG. 16 shows an example of movement of a common subexpression using the dependency ID.

In case the target array elements A[K] determined to be Rc is defined in another location in the loop, movement of a common subexpression is carried out as shown in FIG. 16.

A description will now be given of loop reduction, which is a special case of movement of a common expression. The source program shown in (A) of FIG. 17 subject to movement of a common subexpression as shown in FIG. 16 is modified into a pattern as shown in (B) of FIG. 17 subject to loop reduction. The loop reduction is then applied to the program of (B) of FIG. 17, resulting in a final form as shown in (C) of FIG. 17 in which the level of parallel processing in the loop is increased and the execution performance is improved.

(4) Propagation of the Dependency ID After Loop Expansion

When the optimization using the dependency ID is completed and the loop expansion has been executed, the dependency ID is assigned to the copies of the array elements after the loop expansion. The following is a procedure for assigning the dependency ID after the loop expansion.

(1) When array elements having the dependency ID=0, those having the dependency ID=1 and those having the dependency ID=2–149 (see FIG. 12) are copied in the process of loop expansion, the same dependency ID's as those of the originals are assigned to the copies.

(2) When the data having the dependency ID=150–250 (see FIG. 12) is copied in the process of loop expansion, the dependency ID incremented by one with respect to the dependency ID of the original is assigned to the copies.

FIG. 18 shows the dependency ID before and after the loop expansion.

(5) Reassignment of the Dependency ID

An arbitrary turn in the loop is examined for dependency if that loop has not been subjected to analysis of dependency and if the array elements have the dependency ID's of 50–149. The result of the examination is reflected in the dependency ID. A description will be given of a reason for reassigning the dependency ID to the array elements with the dependency ID's of 50–149 obtained as a result of the analysis of the index space for overlapping.

The data to which the numerals 50–149 (indicating the negative dependency and the positive dependency in the index space) are assigned as a result of the dependency ID assignment using the overlapping analysis has the same dependency ID as that of the original assigned to the copies obtained as a result of the multiple loop expansion. This is because of the fact that the dependency ID assigned using the overlapping analysis results from examination of the entire turns in the loop. Referring to the overlapping of A(I) and A(I+1) in (A) FIG. 18, A(I) being designated as a reference, a dependency arises in the next turn of the loop. Accordingly, the dependency ID of 50 is assigned to A(I) and A(I+1). The same dependency ID of 50 is assigned to the copy of the executable statement involving A(I) and A(I+1).

Once the dependency ID is assigned appropriately, the flexibility in the movement of instructions according to the instruction scheduling is significantly limited. In the instruction scheduling, dependency analysis having the scope of the entire turns of the loop is not required, only identification of the dependency in a single turn of the loop being necessary. In the case of (B) of FIG. 18, A(I) and A(I+1) preferably have different dependency ID's assigned thereto from the viewpoint of the instruction scheduling. In order to resolve the above-described situation, two dependency ID's are prepared. One is a dependency ID for the entire turns of the loop. The other is a dependency ID for a single turn of the loop. The result of applying the dependency ID for a single turn of the loop to the case shown in (B) of FIG. 18 is shown in FIG. 19.

Referring to FIG. 19, s1 indicates the dependency ID for the entire turns of the loop, and s2 indicates the dependency ID for a single turn of the loop.

Since A(I+1) in FIG. 19 both have the same dependency ID, a determination that there is an overlapping results. Therefore, the dependency in this part of the program cannot be removed. However, there is no overlapping between the load instruction of A(I+2) and the storage instruction of A(I) so that it is possible for the load instruction of A(I+2) to be placed ahead of the storing instruction of A(I).

(6) Loop Optimization Enabled After the Loop Expansion

By carrying out optimization using the dependency ID before the loop expansion, the optimization (optimization schemes such as loop reduction, renaming, software pipelining) enabled after the loop expansion is facilitated. The loop reduction induction shown in FIG. 17 is an example of note. Since the loop reduction is an optimization scheme that increases the level of parallel processing and improve the execution performance, the loop reduction induction brings a substantially favorable effect.

(7) Instruction Scheduling

Movement of memory access (load/store) instructions according to the instruction scheduling is carried out, as a rule, based on the dependency. The following is a procedure used in the instruction scheduling for analysis of overlapping using the dependency ID.

(1) A determination is made as to whether or not a target memory access (load/store) instruction in the instruction scheduling can be placed ahead of another memory access (load/store) instruction.

(2) If the target array elements do not have the same format, an examination is made to determine whether or not there is an alias relation (a relation between names assigned to a memory area for access thereto under different names) for the array elements. In the absence of an alias, a determination is made that there is no overlapping. In this case, the target memory access can be placed ahead of another memory access instruction.

(3) If the target array elements have the same format, a determination is made that there is no overlapping is yielded provided that the array elements have different dependency ID's.

(4) When it is determined that the target array elements have the same dependency ID of 50–149, the dependency ID's in the single turn of the loop are compared. If the dependency ID's are found to be different from each other, a determination that there is no overlapping results if the dependency ID's are different.

Figure 20:
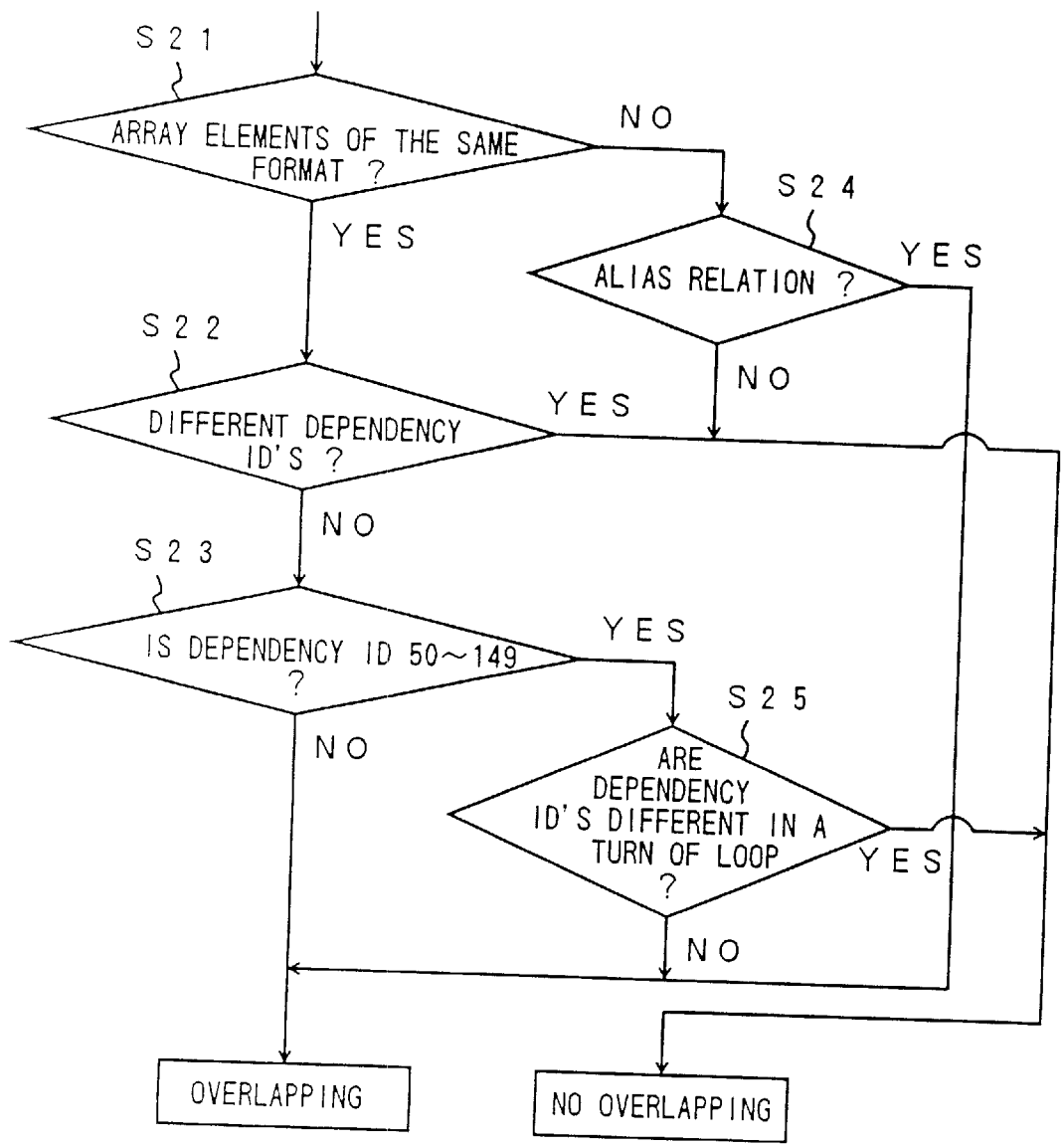
FIG. 20 is a flowchart of a process for identifying an overlapping using the dependency ID.

FIG. 20 is a flowchart of a process according to the instruction scheduling carried out in order to analyze overlappings using the dependency ID.

In step S21, a determination is made as to whether or not the array elements have the same format. If the array elements have the same format, the process goes to step S22. If not, the process goes to step S24.

In step S22, a determination is made as to whether or not the dependency ID's of the array elements are different. If different, a determination is made that there is no overlapping. If the dependency ID's are the same, the process goes to step S23.

In step S23, a determination is made as to whether or not the dependency ID is between 50 and 149. If the dependency ID is not between the range 50–149, a determination is made that there is an overlapping. If the dependency ID is between 50–194, the process goes to step S25.

In step S24, a determination is made as to whether or not there is an alias relation in case it is determined in step S21 that the dependency ID's are not the same. If there is an alias relation, a determination is made that there is an overlapping. If not, a determination is made that there is no overlapping.

In step S25, a determination is made as to whether or not the dependency ID of a single turn of the loop is different from that of the entire loop. If different, a determination is made that there is no overlapping. If not different, a determination is made that there is an overlapping.

As has been described, the present invention allows optimization of the array elements in a loop to be carried out more efficiently. More specifically, optimization effective for a processor capable of issuing a plurality of instructions prompted by a single clock is facilitated so that a program can be executed at a higher speed than the conventional approach.

The present invention is not limited to the above described embodiments, and variations and modifications may be made without departing from the scope of the present invention.

What is claimed is:

1. A loop optimization compile processing method for use in a compile processing apparatus adapted for a computer program and having an optimization function, said loop optimization compile processing method comprising the steps of:

a) analyzing an entire space of a loop for dependencies between array elements and analyzing an arbitrary turn of the loop for dependencies between the array elements; and b) assigning dependency identification information to the array elements, based on an analysis result obtained in step a).

2. The loop optimization compile processing method as claimed in claim 1, further comprising the steps of:

c) detecting loop invariant array elements on the basis of said dependency identification information relating to dependencies between array elements in the entire space of the loop.

3. The loop optimization compile processing method as claimed in claim 1, wherein the loop invariant array elements detected in step c) are targets in a transformation process whereby invariant expressions and common subexpressions are moved to appropriate locations.

4. The loop optimization compile processing method as claimed in claim 2, wherein the loop invariant array elements detected in step c) are targets in a transformation process whereby invariant expressions and common subexpressions are moved to appropriate locations, said loop optimization compile processing method further comprising the step of:

e) carrying out loop optimization for improving a level of parallel processing.

5. The loop optimization compile processing method as claimed in claim 1, wherein instruction scheduling for rearranging instructions on the basis of said dependency identification information is carried out.

6. The loop optimization compile processing method as recited in claim 1, wherein said dependency identification information assigned to said array elements indicates that no overlapping dependency exists for said array elements.

7. The loop optimization compile processing method as recited in claim 1, wherein said dependency identification information assigned to said array elements indicates that no dependency relation exists for the entire space of the loop.

8. The loop optimization compile processing method as recited in claim 1, wherein said dependency identification information assigned to said array elements indicates that a loop carried dependency exists.

9. The loop optimization compile processing method as recited in claim 1, wherein said dependency identification information assigned to said array elements indicates that a dependency exists at a point in the loop.

10. The loop optimization compile processing method as recited in claim 7, further comprising the steps of:

c) identifying an array element as an invariant expression based on said dependency identification information assigned to said array elements indicating that no overlapping dependency exists for said array elements and said dependency identification information assigned to said array elements indicating that no dependency relation exists for the entire space of the loop; and d) moving said invariant expressions to appropriate locations, whereby loop execution speed is improved.

11. The loop optimization compile processing method as recited in claim 8, further comprising the steps of:

c) identifying an array element as an invariant expression based on said dependency identification information assigned to said array elements indicating that a loop carried dependency exists but that no two elements of said array have the same dependency identification information; and d) moving said invariant expressions to appropriate locations, whereby loop execution speed is improved.

12. The loop optimization compile processing method as recited in claim 9, further comprising the steps of:

c) identifying an array element as an invariant expression based on said dependency identification information assigned to said array elements indicating that a dependency exists at a point in the loop and said array elements have the same dependency identification information and the array elements have a different format; and d) moving said invariant expressions to appropriate locations, whereby loop execution speed is improved.

13. A loop optimization compile processing method, comprising the steps of:

a) analyzing an entire space of a loop for dependencies between array elements and analyzing an arbitrary turn of the loop for dependencies between the array elements;

b) assigning dependency identification information to the array elements, based on an analysis result obtained in step a);

c) identifying an array element as an invariant expression based on said dependency identification information assigned to said array elements indicating that no overlapping dependency exists for said array elements and said dependency identification information assigned to said array elements indicating that no dependency relation exists for the entire space of the loop;

d) identifying an array element as an invariant expression based on said dependency identification information assigned to said array elements indicating that a loop carried dependency exists but that no two elements of said array have the same dependency identification information;

e) identifying an array element as an invariant expression based on said dependency identification information assigned to said array elements indicating that a dependency exists at a point in the loop and said array elements have the same dependency identification information and the array elements have a different format;

f) moving said invariant expression to appropriate locations based on identification of the array element in the steps c)–e); and g) carrying out loop optimization for improving a level of parallel processing.

* * * * *